(12) United States Patent
Watanabe et al.

(10) Patent No.: US 9,088,035 B2
(45) Date of Patent: Jul. 21, 2015

(54) NONAQUEOUS ELECTROLYTE SECONDARY BATTERY AND CHARGE/DISCHARGE SYSTEM THEREOF

(75) Inventors: Shoichiro Watanabe, Ikoma-gun (JP); Masatoshi Nagayama, Hirakata (JP); So Kuranaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1719 days.

(21) Appl. No.: 10/552,920

(22) PCT Filed: May 11, 2004

(86) PCT No.: PCT/JP2004/006620
§ 371 (c)(1),
(2), (4) Date: Oct. 11, 2005

(87) PCT Pub. No.: WO2004/102701
PCT Pub. Date: Nov. 25, 2004

(65) Prior Publication Data
US 2006/0194109 A1    Aug. 31, 2006

(30) Foreign Application Priority Data
May 16, 2003   (JP) ................................ 2003-138849

(51) Int. Cl.
*H01M 4/131*    (2010.01)
*H01M 4/133*    (2010.01)
(Continued)

(52) U.S. Cl.
CPC .............. *H01M 4/131* (2013.01); *H01M 4/133* (2013.01); *H01M 10/0525* (2013.01);
(Continued)

(58) Field of Classification Search
None
See application file for complete search history.

(56) References Cited

U.S. PATENT DOCUMENTS

| 5,478,674 | A | | 12/1995 | Miyasaka |
| 5,637,413 | A | * | 6/1997 | Fernandez et al. ................. 429/7 |

(Continued)

FOREIGN PATENT DOCUMENTS

| CN | 1346160 A | 4/2002 |
| EP | 1 295 851 A | 3/2003 |

(Continued)

OTHER PUBLICATIONS

Korean Office Action issue in corresponding Korean Patent Application No. 10-2005-7020899, dated Apr. 27, 2007.

(Continued)

*Primary Examiner* — Barbara Gilliam
*Assistant Examiner* — Adam A Arciero
(74) *Attorney, Agent, or Firm* — McDermott Will & Emery LLP

(57) ABSTRACT

A non-aqueous electrolyte secondary battery including: a positive electrode including a positive electrode material mixture layer; a negative electrode including a negative electrode material mixture layer; a separator or lithium-ion conductive porous film interposed between the positive electrode and the negative electrode; and a lithium-ion conductive non-aqueous electrolyte. The positive electrode material mixture layer contains a positive electrode active material comprising a lithium transition metal composite oxide, and the lithium transition metal composite oxide contains lithium, a transition metal, and a metal different from the transition metal. The negative electrode material mixture layer contains a negative electrode active material comprising a carbon material. In the area where the positive electrode material mixture layer and the negative electrode material mixture layer are opposed to each other, the ratio R:Wp/Wn is 1.3 to 2.2 where Wp is the weight of the positive electrode active material contained in the positive electrode material mixture layer per unit opposed area and Wn is the weight of the negative electrode active material contained in the negative electrode material mixture layer per unit opposed area. The end of charge voltage is set to 4.25 to 4.5 V in normal operation.

8 Claims, 1 Drawing Sheet

(51) Int. Cl.
   *H01M 10/0525* (2010.01)
   *H01M 4/48* (2010.01)
   *H01M 4/58* (2010.01)
   *H01M 4/50* (2010.01)
   *H01M 4/52* (2010.01)
   *H01M 4/485* (2010.01)
   *H01M 4/505* (2010.01)
   *H01M 4/525* (2010.01)
   *H01M 10/0587* (2010.01)
   *H01M 10/44* (2006.01)
   *H01M 10/42* (2006.01)

(52) U.S. Cl.
   CPC .............. *H01M 4/485* (2013.01); *H01M 4/505* (2013.01); *H01M 4/525* (2013.01); *H01M 10/0587* (2013.01); *H01M 10/448* (2013.01); *H01M 2010/4292* (2013.01); *Y02E 60/122* (2013.01)

(56) References Cited

U.S. PATENT DOCUMENTS

| | | | |
|---|---|---|---|
| 5,707,756 A * | 1/1998 | Inoue et al. | 429/57 |
| 6,368,750 B1 * | 4/2002 | Nemoto et al. | 429/231.95 |
| 6,506,515 B1 | 1/2003 | Kitoh et al. | |
| 6,616,715 B2 | 9/2003 | Kitoh et al. | |
| 6,753,111 B2 | 6/2004 | Kweon et al. | |
| 6,800,394 B2 | 10/2004 | Kitoh et al. | |
| 2001/0026885 A1 | 10/2001 | Kitoh et al. | |
| 2002/0094481 A1* | 7/2002 | Goto et al. | 429/218.1 |
| 2002/0127175 A1* | 9/2002 | Gao et al. | 423/594 |
| 2003/0027048 A1* | 2/2003 | Lu et al. | 429/231.1 |
| 2003/0054231 A1 | 3/2003 | Kitoh et al. | |
| 2003/0082448 A1 | 5/2003 | Cho et al. | |
| 2003/0134200 A1 | 7/2003 | Tanaka et al. | |
| 2004/0234853 A1 | 11/2004 | Adachi et al. | |
| 2006/0281005 A1 | 12/2006 | Cho et al. | |

FOREIGN PATENT DOCUMENTS

| | | |
|---|---|---|
| EP | 1 324 418 A | 7/2003 |
| JP | 05-074494 | 3/1993 |
| JP | 6-310143 A | 11/1994 |
| JP | 11-273741 | 10/1999 |
| JP | 2000-348725 A | 12/2000 |
| JP | 2001-307781 A | 11/2001 |
| JP | 2001-351624 A | 12/2001 |
| JP | 2002-42867 A | 2/2002 |
| JP | 2002-203553 A | 7/2002 |
| JP | 2002-289175 | 10/2002 |
| JP | 2002-319398 A | 10/2002 |
| JP | 2003-031219 | 1/2003 |
| JP | 2004-207120 A | 7/2004 |
| KR | 1999-0085717 | 12/1999 |
| KR | 2002-0095421 | 12/2002 |
| WO | WO 03/019713 A1 | 3/2003 |

OTHER PUBLICATIONS

Japanese Office Action issued in Patent Application No. 2003-138849 dated on Jun. 10, 2008.
Korean Office Action dated Oct. 27, 2006.
Chinese Office Action issued in corresponding Chinese Patent Application No. CN 200480011814X, dated Nov. 10, 2006.
European Search Report issued in European Patent Application No. EP 04 73 2213.6 dated Jun. 12, 2009.

* cited by examiner

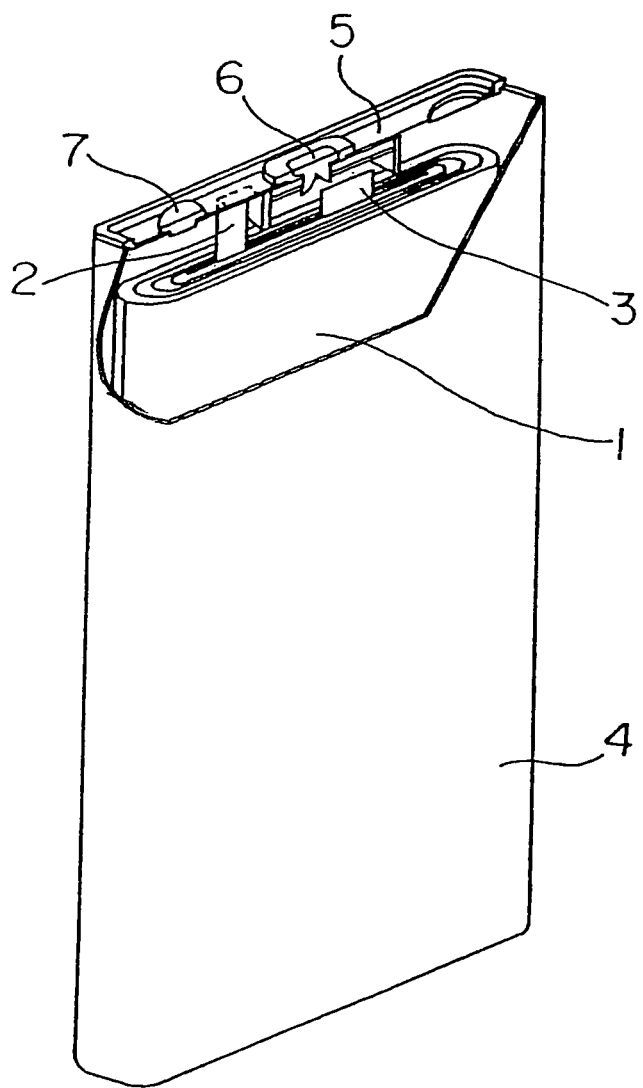

NONAQUEOUS ELECTROLYTE SECONDARY BATTERY AND CHARGE/DISCHARGE SYSTEM THEREOF

RELATED APPLICATION

This application is the U.S. National Phase under 35 U.S.C. §371 of International Application No. PCT/JP2004/006620 filed May 11, 2004 which in turn claims the benefit of Japanese Application No. 2003-138849, filed May 16, 2003, the disclosures of which Applications are incorporated by reference herein in their entirety.

TECHNICAL FIELD

The present invention relates to a non-aqueous electrolyte secondary battery utilizing lithium ions, and particularly, to a non-aqueous electrolyte secondary battery that operates at high voltage.

BACKGROUND ART

Recently, non-aqueous electrolyte secondary batteries used as the main power source for mobile communications appliances and portable electronic appliances have high electromotive force and high energy density. The positive electrode of non-aqueous electrolyte secondary batteries usually comprises a lithium transition metal composite oxide as a positive electrode active material. Among lithium transition metal composite oxides, lithium cobalt oxide ($LiCoO_2$), lithium nickel oxide ($LiNiO_2$), and the like are preferable. These lithium transition metal composite oxides have a potential of 4 V or more relative to lithium.

In the case of non-aqueous electrolyte secondary batteries utilizing lithium ions (lithium ion secondary batteries), if the end of charge voltage of the battery is heightened, the capacity is increased commensurately. Hence, heightening the operating voltage of non-aqueous electrolyte secondary batteries is examined.

For example, in non-aqueous electrolyte secondary batteries including a manganese-containing spinel lithium oxide as a positive electrode active material, there has been a proposal to set the upper limit charge voltage in the range of 4.0 V to 4.5 V. Spinel lithium oxides are stable even at high potential (see Japanese Laid-Open Patent Publication No. 2001-307781).

Predominant non-aqueous electrolyte secondary batteries including a lithium cobalt oxide as a positive electrode active material have a high capacity and excellent characteristics such as cycle characteristics and storage characteristics. However, if such non-aqueous electrolyte secondary batteries are repeatedly charged up to high voltage and discharged, their capacity and the thermal stability of the active material degrade. Thus, the conventional end of charge voltage in normal operation is 4.2 V at most, and even if control circuit errors are allowed for, it is less than 4.25 V at most. If non-aqueous electrolyte secondary batteries are operated at a voltage of 4.25 V or higher, their safety may be particularly impaired.

Even in the case of the end of charge voltage being set to 4.2 V, if the battery is overcharged, for example, accidentally, the battery voltage increases to more than that. In such cases, it is also desired that the positive electrode active material maintain its stable crystal structure. Thus, there has been proposed a technique by which a specific element is incorporated in the form of solid solution in a composite oxide constituting the positive electrode active material (see Japanese Laid-Open Patent Publication No. 2002-203553).

Further, there has also been a proposal to use a mixture of specific two kinds of composite oxides as a positive electrode active material, in order to improve the thermal stability of the battery upon overcharge (see Japanese Laid-Open Patent Publication No. 2002-319398).

DISCLOSURE OF INVENTION

In the case of using a positive electrode active material that is stable at high voltage and setting the end of charge voltage of a non-aqueous electrolyte secondary battery to 4.25 V or higher in normal operation, the utilization rate of the positive electrode improves and the battery capacity increases. However, this causes a change in the relation between the utilization rate of the positive electrode and the load on the negative electrode. Therefore, if the conventional battery design in which the end of charge voltage is set to 4.2 V is employed as it is, the capacity balance between the positive electrode and the negative electrode is destroyed, thereby causing a problem.

It is therefore an object of the present invention to provide a high-capacity non-aqueous electrolyte secondary battery that operates normally even if the end of charge voltage is set to 4.25 V or higher in normal operation. That is, the present invention intends to provide a non-aqueous electrolyte secondary battery capable of securing safety, charge/discharge cycle characteristics, heat resistance, storage characteristics, etc., even if the end of charge voltage is set to 4.25 V or higher in normal operation.

In order to maintain the capacity balance between the positive electrode and the negative electrode while increasing the battery capacity, it is effective to reduce the weight of the positive electrode active material and increase the weight of the negative electrode active material while setting the end of charge voltage to 4.25 V or higher in normal operation. It should be noted, however, that the degree of contribution of the active material to charge and discharge locally varies depending on the electrode position. Therefore, the positional relation between the positive electrode active material and the negative electrode active material also needs to be taken into consideration.

The present invention is achieved in view the above circumstances and relates to a non-aqueous electrolyte secondary battery including: a positive electrode comprising a positive electrode substrate and a positive electrode material mixture layer carried on the positive electrode substrate; a negative electrode comprising a negative electrode substrate and a negative electrode material mixture layer carried on the negative electrode substrate; a separator or lithium-ion conductive porous film interposed between the positive electrode and the negative electrode; and a lithium-ion conductive non-aqueous electrolyte. The positive electrode material mixture layer comprises a positive electrode active material comprising a lithium transition metal composite oxide, the lithium transition metal composite oxide containing lithium, a transition metal, and a metal different from the transition metal. The negative electrode material mixture layer comprises a negative electrode active material comprising a carbon material that is capable of absorbing and desorbing lithium. The end of charge voltage of the non-aqueous electrolyte secondary battery is set to 4.25 to 4.5 V in normal operation. In the area where the positive electrode material mixture layer and the negative electrode material mixture layer are opposed to each other, the ratio R:Wp/Wn is 1.3 to 2.2 where Wp is the weight of the positive electrode active material contained in the positive electrode material mixture layer in unit opposed area and Wn is the weight of the negative electrode active material contained in the negative electrode material mixture layer in unit opposed area.

When the lithium transition metal composite oxide is represented by the general formula (1): $Li_xCo_{1-y}M_yO_2$, where the general formula (1) satisfies $1.0 \leq x \leq 1.03$ and $0.005 \leq y \leq 0.15$ and the element M in the general formula (1) is at least one selected from the group consisting of Mg, Al, Ti, Sr, Mn, Ni and Ca, it is preferred that the ratio R be 1.5 to 2.2.

When the lithium transition metal composite oxide is represented by the general formula (2): $Li_xNi_yMn_zM_{1-y-z}O_2$, where the general formula (2) satisfies $1.0 \leq x \leq 1.03$, $0.3 \leq y \leq 0.5$, $0.3 \leq z \leq 0.5$, and $0.9 \leq y/z \leq 1.1$ and the element M in the general formula (2) is at least one selected from the group consisting of Co, Mg, Al, Ti, Sr and Ca, it is preferred that the ratio R be 1.3 to 2.0.

When the lithium transition metal composite oxide comprises a composite oxide A and a composite oxide B, the composite oxide A is represented by the general formula (1): $Li_xCo_{1-y}M_yO_2$, where the general formula (1) satisfies $1.0 \leq x \leq 1.03$ and $0.005 \leq y \leq 0.15$ and the element M in the general formula (1) is at least one selected from the group consisting of Mg, Al, Ti, Sr, Mn, Ni and Ca, and the composite oxide B is represented by the general formula (2): $Li_xNi_yM_{n_z}M_{1-y-z}O_2$, where the general formula (2) satisfies $1.0 \leq x \leq 1.03$, $0.3 \leq y \leq 0.5$, $0.3 \leq z \leq 0.5$, and $0.9 \leq y/z \leq 1.1$ and the element M in the general formula (2) is at least one selected from the group consisting of Co, Mg, Al, Ti, Sr and Ca, it is preferred that the ratio R be 1.3 to 2.2.

When the lithium transition metal composite oxide comprises the composite oxide A and the composite oxide B, it is preferred that the weight ratio between the composite oxide A and the composite oxide B be 9:1 to 1:9.

In the non-aqueous electrolyte secondary battery in accordance with the present invention, the positive electrode material mixture layer can contain a metal oxide represented by the general formula (3): $MO_x$, in addition to the positive electrode active material. It is preferred that the general formula (3) satisfy $0.4 \leq x \leq 2.0$ and the element M in the general formula (3) be at least one selected from the group consisting of Li, Co, Mg, Al, Ti, Sr, Mn, Ni and Ca.

The present invention also relates to a charge and discharge system for a non-aqueous electrolyte secondary battery, including the above-mentioned non-aqueous electrolyte secondary battery and a charger therefor. The charger is set such that it stops charging when the voltage of the non-aqueous electrolyte secondary battery reaches 4.25 to 4.5 V.

BRIEF DESCRIPTION OF DRAWINGS

FIG. 1 is a partially cut-away perspective view of an exemplary non-aqueous electrolyte secondary battery of the present invention.

BEST MODE FOR CARRYING OUT THE INVENTION

The present invention relates to a non-aqueous electrolyte secondary battery whose end of charge voltage is set to 4.25 to 4.5 V in normal operation. The non-aqueous electrolyte secondary battery of the present invention maintains sufficient safety and operates normally even if it is used with the end of charge voltage set to, for example, 4.30 V or higher, 4.35 V or higher, 4.40 V or higher, or 4.45 V or higher in normal operation.

Thus, in a charge and discharge system including the non-aqueous electrolyte secondary battery of the present invention and a charger therefor, when the voltage of the non-aqueous electrolyte secondary battery reaches 4.25 to 4.5 V, the charging is stopped. Such a system is preferable as the power supply system for devices such as cellular phones and personal computers.

As used herein, normal operation refers to a state of normal operation of a non-aqueous electrolyte secondary battery, or a state of operation recommended by the manufacturer of the battery.

Also, the end of charge voltage refers to a reference voltage at which a constant current charge of a battery is stopped, and when the voltage of a battery that is being charged reaches the reference voltage, the constant current charge of the battery is stopped. Thereafter, usually, at this reference voltage a constant voltage charge is performed. The end of charge voltage is determined in advance depending on the design of the non-aqueous electrolyte secondary battery.

The end of charge voltage in normal operation is usually a preferable voltage for a non-aqueous electrolyte secondary battery to operate normally, or the upper limit voltage in the recommended battery voltage range.

The non-aqueous electrolyte secondary battery according to the present invention includes: a positive electrode including a positive electrode substrate and a positive electrode material mixture layer carried on the positive electrode substrate; a negative electrode including a negative electrode substrate and a negative electrode material mixture layer carried on the negative electrode substrate; a separator or lithium-ion conductive porous film interposed between the positive electrode and the negative electrode; and a lithium-ion conductive non-aqueous electrolyte.

The positive electrode substrate and the negative electrode substrate may be made of any conventionally known material without any particular limitation.

The positive electrode material mixture layer and the negative electrode material mixture layer can contain, without any particular limitation, conventionally known electrode materials, in addition to a positive electrode active material and a negative electrode active material. Exemplary electrode materials include, for example, a conductive agent and a binder.

The positive electrode material mixture layer according to the present invention includes a positive electrode active material comprising a lithium transition metal composite oxide. Also, the negative electrode material mixture layer according to the present invention includes a negative electrode active material comprising a carbon material capable of absorbing and desorbing lithium.

In the area where the positive electrode material mixture layer and the negative electrode material mixture layer are opposed to each other, the ratio R:Wp/Wn is 1.3 to 2.2 where Wp is the weight of the positive electrode active material contained in the positive electrode material mixture layer per unit opposed area and Wn is the weight of the negative electrode active material contained in the negative electrode material mixture layer per unit opposed area.

The lithium transition metal composite oxide forming the positive electrode active material contains lithium, a transition metal as a main component, and a small amount of a metal different from the above-mentioned transition metal. The addition of the different metal enhances the stability of the crystal structure of the lithium transition metal composite oxide. As a result, it is possible to obtain a non-aqueous electrolyte secondary battery that operates normally even if the end of charge voltage is set to a high voltage in normal operation.

The transition metal as the main component is preferably at least one selected from the group consisting of Co, Mn and Ni. When the transition metal as the main component is represented by $M^1$ and the small amount of the different metal is represented by $M^2$, the lithium transition metal composite oxide forming the positive electrode active material can be represented, for example, by the formula: $Li_xM^1_{1-y}M^2_yO_2$ ($1.0 \leq x \leq 1.03$, $0.005 \leq y \leq 0.15$). In non-aqueous electrolyte secondary batteries including as a positive electrode active material a lithium transition metal composite oxide that does not contain a different metal (e.g., $LiCoO_2$), the phase of the composite oxide changes from the hexagonal system to the monoclinic system when the battery voltage is around 4.2 V to 4.45 V. When the battery voltage is around 4.2 V, the potential of the positive electrode is around 4.25 V relative to metal Li. If the battery is further charged, the phase of the composite oxide changes into the hexagonal system, and if the battery voltage reaches around 4.6 V, the monoclinic system appears again. The monoclinic crystal structure appears when the whole crystal is distorted. In such a distorted monoclinic composite oxide, the bonding between the oxygen ion which plays the central role in maintaining the crystal structure and the surrounding metal ions is weak. Thus, the heat resistance of the composite oxide decreases significantly.

Specific examples of the lithium transition metal composite oxide forming the positive electrode active material is hereinafter described.

In the present invention, lithium transition metal composite oxides represented by the general formula (1): $Li_xCo_{1-y}M_yO_2$ (hereinafter referred to as composite oxides A) can be preferably used as positive electrode active materials. The general formula (1) satisfies $1.0 \leq x \leq 1.03$ and $0.005 \leq y \leq 0.15$.

Although the value x changes with charging and discharging of the battery, the composite oxides A as the positive electrode raw materials (i.e., lithium transition metal composite oxides represented by the general formula (1) immediately after the synthesis thereof) satisfy $1.0 \leq x \leq 1.03$.

When the general formula (1) satisfies $1.0 \leq x \leq 1.03$, the baking of raw materials of such a composite oxide A at high temperatures can be performed advantageously upon synthesis of the composite oxide A. Specifically, since the occurrence of shortage of lithium in the composite oxide A is suppressed, the structural stability of the composite oxide A is enhanced.

If x exceeds 1.03, lithium becomes excessive, and the composite oxide A becomes relatively strongly alkaline. As a result, the stability of the composite oxide A in positive electrode preparation may be impaired, or the positive electrode substrate made of, for example, Al may be corroded. If x is 1.0 or more, the effect of suppressing the occurrence of lithium shortage can be obtained, but it is particularly preferred that x be 1.01 or more, in order to further enhance the structural stability of the composite oxide A. On the other hand, if x is less than 1.0, lithium becomes insufficient, so that the composite oxide A does not provide high performance as a positive electrode active material. That is, the content of a by-product, such as $Co_3O_4$, contained in the composite oxide A becomes high, thereby resulting in gas evolution due to the by-product inside the battery, capacity degradation, etc.

In the general formula (1), the element M is at least one selected from the group consisting of Mg, Al, Ti, Sr, Mn, Ni and Ca. The element M contributes to stabilization of the crystal structure of the composite oxide A. Among Mg, Al, Ti, Sr, Mn, Ni and Ca, it is particularly preferred to use at least one selected from the group consisting of Mg, Al and Mn. In order for the element M to produce the effect of stabilizing the crystal structure, at least $0.005 \leq y$ is required to be satisfied. However, when $0.15 < y$, the problem of capacity degradation of the positive electrode active material arises.

Among the composite oxides A, particularly, lithium transition metal composite oxides represented by the general formula (1'): $Li_xCo_{1-y-z}Mg_yAl_zO_2$ (hereinafter referred to as composite oxides A') can be preferably used. The general formula (1') satisfies $1.0 \leq x \leq 1.03$, $0.005 \leq y+z \leq 0.15$, and $0.001 \leq z \leq 0.05$.

The thermal stability of the composite oxides A' is almost the same, for example, when the positive electrode potential is 4.8 V relative to lithium metal, as when the positive electrode potential is 4.2 V relative to lithium metal.

Although the reason why such thermal stability can be obtained is not clear at the moment, the following is thought to be relevant.

First, the replacement of Co with a preferable amount of Mg increases the stability of crystal structure of a composite oxide A' even in a state of a high degree of Li elimination due to charging. As a result, even at high temperatures, the elimination of oxygen from the composite oxide A' and the like are suppressed.

Also, since the composite oxide A' has high electronic conductivity, it is thought to function also as a conductive agent in the positive electrode. The conductive agent contributes to formation of a uniform potential distribution in the positive electrode. Upon formation of a uniform potential distribution in the positive electrode, it is thought that the amount of Co that locally has a higher potential than the surrounding is relatively decreased, so that the degradation in thermal stability is suppressed.

In the general formula (1'), if x exceeds 1.03, lithium becomes excessive, and such a composite oxide A' becomes relatively strongly alkaline. As a result, the stability of the composite oxide A' in positive electrode preparation may be impaired, or the positive electrode substrate made of, for example, Al may be corroded. Also, if x is less than 1.0, lithium becomes insufficient, so that the composite oxide A' does not provide high performance as a positive electrode active material. That is, the content of a by-product, such as $Co_3O_4$, contained in the composite oxide A' becomes high, thereby resulting in gas evolution due to the by-product inside the battery, capacity degradation, etc. In the general formula (1'), if y+z becomes less than 0.005, the element M does not produce the effect of stabilizing the crystal structure. If y+z exceeds 0.15, the capacity degradation of the positive electrode active material becomes a problem.

On the other hand, although the reason is not clear at the moment, Al has the effect of further strengthening the Mg's function of improving the structural stability and heat resistance of the composite oxides A'. This effect can be obtained if z is 0.001 or more. However, the amount of Co replaced by Al needs to be small, and if z exceeds 0.05, the capacity of the positive electrode may degrade significantly.

Next, in the present invention, lithium transition metal composite oxides represented by the general formula (2): $Li_xNi_yMn_zM_{1-y-z}O_2$ (hereinafter referred to as composite oxides B) can be preferably used as positive electrode active materials. The general formula (2) satisfies $1.0 \leq x \leq 1.03$, $0.3 \leq y \leq 0.5$, $0.3 \leq z \leq 0.5$, and $0.9 \leq y/z \leq 1.1$.

Although the value x changes with charging and discharging of the battery, the composite oxides B as the positive electrode raw materials (i.e., lithium transition metal composite oxides represented by the general formula (2) immediately after the synthesis thereof) satisfy $1.0 \leq x \leq 1.03$.

When the general formula (2) satisfies $1.0 \leq x \leq 1.03$, the baking of raw materials of such a composite oxide B at high temperatures can be performed advantageously upon synthesis of the composite oxide B. Specifically, since the occurrence of shortage of lithium in the composite oxide B is suppressed, the structural stability of the composite oxide B is enhanced.

In the general formula (2), if x exceeds 1.03, lithium becomes excessive, and such a composite oxide B becomes relatively strongly alkaline. As a result, the stability of the composite oxide B in positive electrode preparation may be impaired, or the positive electrode substrate made of, for example, Al may be corroded. If x is 1.0 or more, the effect of suppressing the occurrence of lithium shortage can be obtained, but it is particularly preferred that x be 1.01 or more, in order to further enhance the structural stability of the composite oxide B. On the other hand, if x is less than 1.0, lithium becomes insufficient, so that the composite oxide B does not provide high performance as a positive electrode active material. That is, the content of a by-product, such as $Co_3O_4$, contained in the composite oxide B becomes high, thereby resulting in gas evolution due to the by-product inside the battery, capacity degradation, etc.

The crystal structure of the composite oxides B belongs to the hexagonal system only when y representing the Ni content and z representing the Mn content in the general formula (2) satisfy $0.3 \leq y \leq 0.5$, $0.3 \leq z \leq 0.5$, and $0.9 \leq y/z \leq 1.1$. This range is a singular range exhibiting singular behavior in X-ray analysis and the like.

In the general formula (2), the element M is at least one selected from the group consisting of Co, Mg, Al, Ti, Sr and Ca. The element M contributes to stabilization of the crystal structure of the composite oxides B. The addition of the element M increases the stability of the composite oxides B having a high potential, but x, y and z need to satisfy the above ranges.

A mixture of a composite oxide A and a composite oxide B can also be used preferably as a positive electrode active material. This is because the composite oxide A and the composite oxide B do not interfere with each other.

In the mixture, the weight ratio between the composite oxide A and the composite oxide B is preferably 9:1 to 1:9. If the weight ratio is in such a range, the electronic conductivity of the composite oxide A and the high capacity of the composite oxide B produce complementary effects.

Next, in the non-aqueous electrolyte secondary battery of the present invention, in the area where the positive electrode material mixture layer and the negative electrode material mixture layer are opposed to each other, the ratio R:Wp/Wn is set to 1.3 to 2.2 where Wp is the weight of the positive electrode active material contained in the positive electrode material mixture layer per unit opposed area and Wn is the weight of the negative electrode active material contained in the negative electrode material mixture layer per unit opposed area.

The reason why the ratio R is set to the above range is as follows. In the non-aqueous electrolyte secondary battery of the present invention, the positive electrode has a large load. Thus, in the area where the positive electrode material mixture layer and the negative electrode material mixture layer are opposed to each other, there is a need to reduce the weight of the positive electrode active material relative to the conventional weight, in order to control the capacity balance between the positive electrode and the negative electrode.

The ratio R can also be defined as the capacity ratio. However, in actual production of batteries, a predetermined weight of a positive electrode active material and a predetermined weight of a negative electrode active material are measured. Thus, employing the weight ratio is more clear.

If the ratio R becomes less than 1.3, the substantial amount of the negative electrode active material becomes extremely excessive relative to the amount of the positive electrode active material in the area where the positive electrode material mixture layer and the negative electrode material mixture layer are opposed to each other. As a result, the thermal stability of the battery degrades, and the safety of the battery upon exposure to high temperatures deteriorates. Also, if the ratio R exceeds 2.2, the negative electrode load becomes too heavy relative to the positive electrode load. Consequently, upon repetition of charge/discharge cycles, lithium metal may be deposited on the negative electrode, thereby resulting in deterioration in battery reliability.

In the case of using either a composite oxide A or a composite oxide B as a positive electrode active material, and when using the composite oxide A, the ratio R is preferably in the range of 1.5 to 2.2, more preferably in the range of 1.5 to 2.0, and particularly preferably in the range of 1.5 to 1.8.

Also, in the case of using either a composite oxide A or a composite oxide B as a positive electrode active material, and when using the composite oxide B, the ratio R is preferably in the range of 1.3 to 2.0, and more preferably in the range of 1.3 to 1.8.

Also, in the case of using a mixture of a composite oxide A and a composite oxide B as a positive electrode active material, the ratio R is preferably in the range of 1.3 to 2.2.

In the non-aqueous electrolyte secondary battery of the present invention, the positive electrode material mixture layer can contain a metal oxide represented by the general formula (3): $MO_x$, in addition to the positive electrode active material. The general formula (3) satisfies $0.4 \leq x \leq 2.0$, and the element M in the general formula (3) is preferably at least one selected from the group consisting of Li, Co, Mg, Al, Ti, Sr, Mn, Ni and Ca.

The carbon material capable of absorbing and desorbing lithium that forms the negative electrode active material may be any conventionally known material without any particular limitation. Examples include thermally decomposed carbons, cokes such as pitch coke, needle coke, and petroleum coke, graphites, glass carbons, materials obtained by baking phenolic resin, furan resin, or the like at an appropriate temperature and carbonizing it (baked organic polymer compound), carbon fibers, and active carbon. Among them, graphites are particularly preferable.

The lithium-ion conductive non-aqueous electrolyte is preferably a non-aqueous electrolyte comprising a non-aqueous solvent and a lithium salt dissolved therein.

The non-aqueous solvent may be any conventionally known one without any particular limitation. Examples include cyclic carbonic acid esters such as ethylene carbonate (EC) and propylene carbonate (PC), non-cyclic carbonic acid esters such as dimethyl carbonate (DMC), diethyl carbonate (DEC), ethyl methyl carbonate (EMC), and dipropyl carbonate (DPC), and cyclic carboxylic acid esters. Among them, a solvent mixture of a cyclic carbonic acid ester and a non-cyclic carbonic acid ester is preferably used.

The lithium salt may be any conventionally known one without any particular limitation, but $LiPF_6$, $LiBF_4$, or the like is preferably used. It is also possible to use a combination of two or more kinds of lithium salts.

The separator interposed between the positive electrode and the negative electrode is preferably a microporous thin film having ionic permeability, mechanical strength, and an electron-insulating property in good balance. It is preferred that the separator have the function of closing its pores above a certain temperature to increase internal resistance. The pore size of the separator is desirably such that the electrode active materials, binder, conductive agent, etc., that have fallen off the electrodes do not pass through the pores, and it is, for example, 0.01 to 1 µm. The thickness of the separator is, for example, 10 to 300 µm. The porosity of the separator is, for example, 30 to 80%.

The lithium-ion conductive porous film interposed between the positive electrode and the negative electrode may be a porous film comprising a polymer material bonded to the surface of the positive electrode or negative electrode. Such a porous film can be formed by applying a mixture of a polymer material and a solvent on the electrode surface and volatilizing the solvent. The porous film serves to hold the lithium-ion conductive non-aqueous electrolyte. Exemplary polymer materials include polyvinylidene fluoride and vinylidene fluoride-hexafluoropropylene copolymer.

The present invention is hereinafter described more specifically by way of Examples.

Example 1

(1) Positive Electrode Preparation

A composite oxide A, $LiCo_{0.94}Mg_{0.05}Al_{0.01}O_2$ was used as a positive electrode active material.

A positive electrode material mixture paste was prepared by mixing 100 parts by weight of the positive electrode active material, 3 parts by weight of acetylene black as a conductive agent, 5 parts by weight of polyvinylidene fluoride as a binder, and a suitable amount of N-methyl-2-pyrrolidone.

Subsequently, the positive electrode material mixture paste was applied to both sides of a positive electrode current collector made of a 20 µm-thick aluminum foil, and the applied film was dried and rolled with rollers, to form a positive electrode material mixture layer. Thereafter, the positive electrode current collector with the positive electrode material mixture layers carried on both sides thereof was cut into a sheet of predetermined dimensions, to prepare a positive electrode.

The weight Wp of the positive electrode active material contained in the positive electrode material mixture layer per unit area (the positive electrode material mixture layer carried on one side of the positive electrode current collector per unit area) was 22.8 mg/cm².

(2) Negative Electrode Preparation

Flake graphite with a mean particle size of approximately 20 µm was used as a negative electrode active material.

A negative electrode material mixture paste was prepared by mixing 100 parts by weight of the negative electrode active material, 3 parts by weight of styrene/butadiene rubber as a binder, 1 part by weight of carboxymethyl cellulose, and a suitable amount of water.

Subsequently, the negative electrode material mixture paste was applied to both sides of a current collector made of a 15 µm-thick copper foil, and the applied film was dried and rolled with rollers, to prepare a negative electrode material mixture layer. Thereafter, the negative electrode current collector with the negative electrode material mixture layers carried on both sides thereof was cut into a sheet having predetermined dimensions, to prepare a negative electrode.

The weight Wn of the negative electrode active material contained in the negative electrode material mixture layer per unit area (the negative electrode material mixture layer carried on one side of the negative electrode current collector per unit area) was 11.4 mg/cm².

The dimensions of the negative electrode were made larger than those of the positive electrode.

It should be noted that in the area where the positive electrode material mixture layer and the negative electrode material mixture layer are not opposed to each other, the electrode active materials do not contribute to charge and discharge. Thus, in this area, there is no need to control the amounts of the electrode active materials contained in the electrode material mixture layers per unit area.

(3) Non-Aqueous Electrolyte Preparation

A non-aqueous electrolyte was prepared by mixing ethylene carbonate and ethyl methyl carbonate in a weight ratio of 30:70 and dissolving $LiPF_6$ at a concentration of 1.0 mol/L in the resultant solvent mixture.

(4) Electrode Group Fabrication

The positive electrode sheet and the negative electrode sheet prepared in the above manner were spirally wound, with a separator interposed therebetween, to obtain an electrode group. The separator used was a 25 µm-thick microporous thin film made of polyethylene resin.

In this example, in the area where the positive electrode material mixture layer and the negative electrode material mixture layer were opposed to each other, the ratio R:Wp/Wn was 2.0 where Wp is the weight of the positive electrode active material contained in the positive electrode material mixture layer per unit opposed area and Wn is the weight of the negative electrode active material contained in the negative electrode material mixture layer per unit opposed area.

(5) Battery Fabrication

Using an electrode group 1 thus obtained, a rectangular non-aqueous electrolyte secondary battery (thickness 5.2 mm, width 34 mm, height 50 mm), as illustrated in FIG. 1, was produced.

As illustrated in FIG. 1, one end of an aluminum positive electrode lead 2 and one end of a nickel negative electrode lead 3 were welded to the positive electrode and the negative electrode, respectively. An insulating ring made of polyethylene resin was fitted on the electrode group 1, which was then placed in an aluminum battery case 4. The other end of the positive electrode lead 2 was spot-welded to an aluminum sealing plate 5. The other end of the negative electrode lead 3 was spot-welded to a lower part of a nickel negative electrode terminal 6 positioned in the center of the sealing plate 5. The opening end of the battery case 4 was welded by laser to a peripheral part of the sealing plate 5. A predetermined amount of the non-aqueous electrolyte was injected therein from an inlet before the inlet was closed with an aluminum sealing stopper 7. Lastly, the inlet was closed with the sealing stopper 7, followed by laser welding. This completed a battery (hereinafter referred to as battery 6).

(6) Production of Various Batteries

Batteries 1 to 5 and 7 to 9 were produced in the same manner as the battery 6, except that the ratio R:Wp/Wn was varied in the area where the positive electrode material mixture layer and the negative electrode material mixture layer were opposed to each other, as listed in Table 1.

Also, batteries 10 to 29 were produced in the same manner as the battery 6, except that the composite oxides A as shown in Table 1 were used as the positive electrode active materials and the ratio R:Wp/Wn was varied as shown in Table 1.

Further, for comparison, batteries A and B were produced in the same manner as the batteries 6 and 4, except that $LiCoO_2$ was used alone as the positive electrode active material.

Table 1 shows the relations between Wp, Wn, and the ratio R:Wp/Wn of the respective batteries.

TABLE 1

| Positive electrode active material | R: Wp/Wn | Active material weight (mg/cm$^2$) Wp | Wn |
|---|---|---|---|
| Battery 1 | LiCo$_{0.94}$Mg$_{0.05}$Al$_{0.01}$O$_2$ | 1.20 | 18.8 | 15.7 |
| Battery 2 | LiCo$_{0.94}$Mg$_{0.05}$Al$_{0.01}$O$_2$ | 1.30 | 19.3 | 14.8 |
| Battery 3 | LiCo$_{0.94}$Mg$_{0.05}$Al$_{0.01}$O$_2$ | 1.40 | 19.8 | 14.1 |
| Battery 4 | LiCo$_{0.94}$Mg$_{0.05}$Al$_{0.01}$O$_2$ | 1.50 | 20.3 | 13.5 |
| Battery 5 | LiCo$_{0.94}$Mg$_{0.05}$Al$_{0.01}$O$_2$ | 1.75 | 21.5 | 12.3 |
| Battery 6 | LiCo$_{0.94}$Mg$_{0.05}$Al$_{0.01}$O$_2$ | 2.00 | 22.8 | 11.4 |
| Battery 7 | LiCo$_{0.94}$Mg$_{0.05}$Al$_{0.01}$O$_2$ | 2.20 | 23.7 | 10.8 |
| Battery 8 | LiCo$_{0.94}$Mg$_{0.05}$Al$_{0.01}$O$_2$ | 2.30 | 24.3 | 10.6 |
| Battery 9 | LiCo$_{0.94}$Mg$_{0.05}$Al$_{0.01}$O$_2$ | 2.40 | 24.8 | 10.3 |
| Battery A | LiCoO$_2$ | 2.00 | 22.8 | 11.4 |
| Battery B | LiCoO$_2$ | 1.50 | 20.3 | 13.5 |
| Battery 10 | Li$_{1.01}$Co$_{0.94}$Mg$_{0.05}$Al$_{0.01}$O$_2$ | 2.00 | 22.8 | 11.4 |
| Battery 11 | Li$_{1.01}$Co$_{0.94}$Mg$_{0.05}$Al$_{0.01}$O$_2$ | 1.50 | 20.3 | 13.5 |
| Battery 12 | Li$_{1.02}$Co$_{0.94}$Mg$_{0.05}$Al$_{0.01}$O$_2$ | 2.00 | 22.8 | 11.4 |
| Battery 13 | Li$_{1.02}$Co$_{0.94}$Mg$_{0.05}$Al$_{0.01}$O$_2$ | 1.50 | 20.3 | 13.5 |
| Battery 14 | Li$_{1.03}$Co$_{0.94}$Mg$_{0.05}$Al$_{0.01}$O$_2$ | 2.00 | 22.8 | 11.4 |
| Battery 15 | Li$_{1.03}$Co$_{0.94}$Mg$_{0.05}$Al$_{0.01}$O$_2$ | 1.50 | 20.3 | 13.5 |
| Battery 16 | LiCo$_{0.985}$Mg$_{0.005}$Al$_{0.01}$O$_2$ | 2.00 | 22.8 | 11.4 |
| Battery 17 | LiCo$_{0.985}$Mg$_{0.005}$Al$_{0.01}$O$_2$ | 1.50 | 20.3 | 13.5 |
| Battery 18 | LiCo$_{0.89}$Mg$_{0.1}$Al$_{0.01}$O$_2$ | 2.00 | 22.8 | 11.4 |
| Battery 19 | LiCo$_{0.89}$Mg$_{0.1}$Al$_{0.01}$O$_2$ | 1.50 | 20.3 | 13.5 |
| Battery 20 | LiCo$_{0.949}$Mg$_{0.05}$Al$_{0.001}$O$_2$ | 2.00 | 22.8 | 11.4 |
| Battery 21 | LiCo$_{0.949}$Mg$_{0.05}$Al$_{0.001}$O$_2$ | 1.50 | 20.3 | 13.5 |
| Battery 22 | LiCo$_{0.9}$Mg$_{0.05}$Al$_{0.05}$O$_2$ | 2.00 | 22.8 | 11.4 |
| Battery 23 | LiCo$_{0.9}$Mg$_{0.05}$Al$_{0.05}$O$_2$ | 1.50 | 20.3 | 13.5 |
| Battery 24 | LiCo$_{0.994}$Mg$_{0.005}$Al$_{0.001}$O$_2$ | 2.00 | 22.8 | 11.4 |
| Battery 25 | LiCo$_{0.994}$Mg$_{0.005}$Al$_{0.001}$O$_2$ | 1.50 | 20.3 | 13.5 |
| Battery 26 | LiCo$_{0.85}$Mg$_{0.1}$Al$_{0.05}$O$_2$ | 2.00 | 22.8 | 11.4 |
| Battery 27 | LiCo$_{0.85}$Mg$_{0.1}$Al$_{0.05}$O$_2$ | 1.50 | 20.3 | 13.5 |
| Battery 28 | LiCo$_{0.88}$Mg$_{0.1}$Al$_{0.02}$O$_2$ | 2.00 | 22.8 | 11.4 |
| Battery 29 | LiCo$_{0.88}$Mg$_{0.1}$Al$_{0.02}$O$_2$ | 1.50 | 20.3 | 13.5 |

(7) Experimental Evaluation

<a> Charge/Discharge Cycle Characteristics

The charge/discharge cycle of the batteries 1 to 29 and comparative batteries A and B produced in the above manner was repeated 500 times at an ambient temperature of 20° C.

The charging conditions are as follows.
Constant voltage charge duration: 2 hours
Maximum current: 600 mA
End of charge voltage: 4.25 V, 4.4 V, or 4.5 V
The discharging conditions are as follows.
Constant current discharge
Current value: 600 mA
End of discharge voltage: 3.0 V After the 500 cycles of charge/discharge, the discharge capacity of each battery was measured, and the ratio of this discharge capacity to the initial discharge capacity was found as the capacity maintenance rate. Table 2 shows the results.

TABLE 2

| Positive electrode active material | R: Wp/Wn | End of charge voltage 4.25 V | 4.4 V | 4.5 V |
|---|---|---|---|---|
| Battery 1 | LiCo$_{0.94}$Mg$_{0.05}$Al$_{0.01}$O$_2$ | 1.20 | 76% | 73% | 70% |
| Battery 2 | LiCo$_{0.94}$Mg$_{0.05}$Al$_{0.01}$O$_2$ | 1.30 | 78% | 74% | 73% |
| Battery 3 | LiCo$_{0.94}$Mg$_{0.05}$Al$_{0.01}$O$_2$ | 1.40 | 79% | 76% | 74% |
| Battery 4 | LiCo$_{0.94}$Mg$_{0.05}$Al$_{0.01}$O$_2$ | 1.50 | 80% | 82% | 80% |
| Battery 5 | LiCo$_{0.94}$Mg$_{0.05}$Al$_{0.01}$O$_2$ | 1.75 | 81% | 81% | 80% |
| Battery 6 | LiCo$_{0.94}$Mg$_{0.05}$Al$_{0.01}$O$_2$ | 2.00 | 80% | 77% | 75% |
| Battery 7 | LiCo$_{0.94}$Mg$_{0.05}$Al$_{0.01}$O$_2$ | 2.20 | 79% | 74% | 73% |
| Battery 8 | LiCo$_{0.94}$Mg$_{0.05}$Al$_{0.01}$O$_2$ | 2.30 | 70% | 64% | 59% |
| Battery 9 | LiCo$_{0.94}$Mg$_{0.05}$Al$_{0.01}$O$_2$ | 2.40 | 65% | 50% | 40% |
| Battery A | LiCoO$_2$ | 2.00 | 45% | 39% | 31% |
| Battery B | LiCoO$_2$ | 1.50 | 44% | 40% | 30% |
| Battery 10 | Li$_{1.01}$Co$_{0.94}$Mg$_{0.05}$Al$_{0.01}$O$_2$ | 2.00 | 79% | 78% | 76% |
| Battery 11 | Li$_{1.01}$Co$_{0.94}$Mg$_{0.05}$Al$_{0.01}$O$_2$ | 1.50 | 81% | 81% | 80% |
| Battery 12 | Li$_{1.02}$Co$_{0.94}$Mg$_{0.05}$Al$_{0.01}$O$_2$ | 2.00 | 80% | 79% | 78% |
| Battery 13 | Li$_{1.02}$Co$_{0.94}$Mg$_{0.05}$Al$_{0.01}$O$_2$ | 1.50 | 79% | 80% | 78% |
| Battery 14 | Li$_{1.03}$Co$_{0.94}$Mg$_{0.05}$Al$_{0.01}$O$_2$ | 2.00 | 80% | 77% | 76% |
| Battery 15 | Li$_{1.03}$Co$_{0.94}$Mg$_{0.05}$Al$_{0.01}$O$_2$ | 1.50 | 81% | 79% | 78% |
| Battery 16 | LiCo$_{0.985}$Mg$_{0.005}$Al$_{0.01}$O$_2$ | 2.00 | 75% | 73% | 72% |
| Battery 17 | LiCo$_{0.985}$Mg$_{0.005}$Al$_{0.01}$O$_2$ | 1.50 | 74% | 72% | 70% |
| Battery 18 | LiCo$_{0.89}$Mg$_{0.1}$Al$_{0.01}$O$_2$ | 2.00 | 80% | 81% | 80% |
| Battery 19 | LiCo$_{0.89}$Mg$_{0.1}$Al$_{0.01}$O$_2$ | 1.50 | 82% | 80% | 76% |
| Battery 20 | LiCo$_{0.949}$Mg$_{0.05}$Al$_{0.001}$O$_2$ | 2.00 | 79% | 76% | 74% |
| Battery 21 | LiCo$_{0.949}$Mg$_{0.05}$Al$_{0.001}$O$_2$ | 1.50 | 78% | 77% | 75% |
| Battery 22 | LiCo$_{0.9}$Mg$_{0.05}$Al$_{0.05}$O$_2$ | 2.00 | 79% | 78% | 77% |
| Battery 23 | LiCo$_{0.9}$Mg$_{0.05}$Al$_{0.05}$O$_2$ | 1.50 | 80% | 79% | 78% |
| Battery 24 | LiCo$_{0.994}$Mg$_{0.005}$Al$_{0.001}$O$_2$ | 2.00 | 72% | 68% | 62% |
| Battery 25 | LiCo$_{0.994}$Mg$_{0.005}$Al$_{0.001}$O$_2$ | 1.50 | 76% | 73% | 70% |
| Battery 26 | LiCo$_{0.85}$Mg$_{0.1}$Al$_{0.05}$O$_2$ | 2.00 | 80% | 77% | 75% |
| Battery 27 | LiCo$_{0.85}$Mg$_{0.1}$Al$_{0.05}$O$_2$ | 1.50 | 81% | 78% | 76% |
| Battery 28 | LiCo$_{0.88}$Mg$_{0.1}$Al$_{0.02}$O$_2$ | 2.00 | 79% | 76% | 75% |
| Battery 29 | LiCo$_{0.88}$Mg$_{0.1}$Al$_{0.02}$O$_2$ | 1.50 | 80% | 78% | 76% |

As can be seen from Table 2, the batteries 1 to 29, which use the positive electrode active materials containing Mg and Al, have better capacity maintenance rates after the 500 cycles of charge/discharge than the comparative batteries A and B, which use LiCoO$_2$ as the positive electrode active material. Also, even in the case of setting the end of charge voltage in charge/discharge cycles to the high voltage of 4.25 V or higher, the batteries 1 to 29 maintain high capacity maintenance rates.

The battery A after the 500 cycles of charge/discharge was disassembled to collect its positive electrode active material of LiCoO$_2$, which was then subjected to an X-ray diffraction analysis. As a result, it was found that the crystal structure of LiCoO$_2$ was largely different from the initial state. This has confirmed that if charge/discharge is repeated with the end of charge voltage set to a high voltage, LiCoO$_2$ deteriorates significantly.

On the other hand, the batteries 1 to 9 after the 500 cycles of charge/discharge were disassembled to collect their positive electrode active materials of LiCo$_{0.94}$Mg$_{0.05}$Al$_{0.01}$O$_2$, which were then subjected to an X-ray diffraction analysis. As a result, it was found that the crystal structure of LiCo$_{0.94}$Mg$_{0.05}$Al$_{0.01}$O$_2$ maintained the initial state with a high fraction. This has confirmed that even if charge/discharge is repeated with the end of charge voltage set to a high voltage, the crystal structure of LiCo$_{0.94}$Mg$_{0.05}$Al$_{0.01}$O$_2$ is stable.

Also, the batteries 1 to 7 and 10 to 29, whose ratios R:Wp/Wn were equal to or below 2.2, exhibited better capacity maintenance rates particularly when the end of charge voltage was set high than the batteries 8 and 9, whose ratios R were greater than 2.2.

The batteries 8 and 9 exhibited no deterioration in the X-ray diffraction analyses of the crystal structures of their positive electrodes. However, due to their large ratios R and large negative electrode loads during charging, their negative electrode potentials are constantly low. As a result, it has become clear that due to accumulation of reductive decomposition products of the non-aqueous electrolyte, the charge/discharge reactions are inhibited. This indicates that if the ratio R:Wp/Wn exceeds 2.2, the repetition of the charge/discharge cycles causes an increase in the resistance to the movement of lithium ions inside the battery, thereby leading to a gradual degradation of the capacity.

Also, when the positive electrode active materials used therein are represented by $Li_xCo_{1-y-z}Mg_yAl_zO_2$, even if x, y and z are varied within the ranges of $1.0 \leq x \leq 1.03$, $0.005 \leq y+z \leq 0.15$, and $0.001 \leq z \leq 0.05$, high capacity maintenance rates are obtained.

From the above, it has been confirmed that the batteries using the predetermined positive electrode active materials exhibit high charge/discharge cycle characteristics even if they are repeatedly charged and discharged with the end of charge voltage set to the high voltage of 4.25 V to 4.5 V. It has also been confirmed that the batteries whose ratios R:Wp/Wn are controlled in the predetermined range provide particularly good charge/discharge cycle characteristics.

<b> Thermorunaway Threshold Temperature

The batteries whose initial capacities had been checked were charged up to a predetermined end of charge voltage. The charged batteries were placed in a temperature controller, and the threshold temperature leading to thermorunaway was measured by increasing the battery temperature at 5° C./min.

The charging conditions are as follows.
Constant voltage charge duration: 2 hours
Maximum current: 600 mA
End of charge voltage: 4.2 V, 4.25 V, 4.4 V or 4.5 V Table 3 shows thermorunaway threshold temperatures of the respective batteries in respective charged states.

On the other hand, in the case of the batteries 1 to 29, which used the positive electrode active materials containing Mg and Al, even when the end of charge voltage was set to the very high voltage of 4.5 V, they maintained thermorunaway threshold temperatures of 150° C. or higher. That is, it has been clearly confirmed that the batteries 1 to 29 have high safety.

Also, among the batteries 4 to 7 and 10 to 29 whose ratios R:Wp/Wn were set in the range of 1.5 or more and 2.2 or less, many of them exhibited thermorunaway threshold temperatures of 170° C. or higher, even if the end of charge voltage was set to the very high voltage of 4.5 V. That is, it has been clearly confirmed that the batteries whose ratios R:Wp/Wn were set in the range of 1.5 or more and 2.2 or less have very high safety.

In the batteries whose ratios R:Wp/Wn were set to 1.4 or less, the weight of the negative electrode active material is greater relative to the weight of the positive electrode active material, and hence, it is thought that large heat is generated by the decomposition reaction of the non-aqueous electrolyte by the negative electrode. This is considered to be the reason why the safety of these batteries deteriorated slightly. Particularly, the battery whose ratio R was 1.2 exhibited a large decrease in the thermorunaway threshold temperature.

TABLE 3

| | Positive electrode active material | R: Wp/Wn | End of charge voltage | | | |
|---|---|---|---|---|---|---|
| | | | 4.2 V | 4.25 V | 4.4 V | 4.5 V |
| Battery 1 | $LiCo_{0.94}Mg_{0.05}Al_{0.01}O_2$ | 1.20 | 160° C. | 154° C. | 152° C. | 150° C. |
| Battery 2 | $LiCo_{0.94}Mg_{0.05}Al_{0.01}O_2$ | 1.30 | 166° C. | 162° C. | 160° C. | 155° C. |
| Battery 3 | $LiCo_{0.94}Mg_{0.05}Al_{0.01}O_2$ | 1.40 | 170° C. | 166° C. | 164° C. | 160° C. |
| Battery 4 | $LiCo_{0.94}Mg_{0.05}Al_{0.01}O_2$ | 1.50 | 175° C. | 173° C. | 172° C. | 170° C. |
| Battery 5 | $LiCo_{0.94}Mg_{0.05}Al_{0.01}O_2$ | 1.75 | 173° C. | 171° C. | 172° C. | 170° C. |
| Battery 6 | $LiCo_{0.94}Mg_{0.05}Al_{0.01}O_2$ | 2.00 | 174° C. | 173° C. | 171° C. | 171° C. |
| Battery 7 | $LiCo_{0.94}Mg_{0.05}Al_{0.01}O_2$ | 2.20 | 173° C. | 172° C. | 172° C. | 172° C. |
| Battery 8 | $LiCo_{0.94}Mg_{0.05}Al_{0.01}O_2$ | 2.30 | 170° C. | 162° C. | 160° C. | 155° C. |
| Battery 9 | $LiCo_{0.94}Mg_{0.05}Al_{0.01}O_2$ | 2.40 | 168° C. | 158° C. | 150° C. | 150° C. |
| Battery A | $LiCoO_2$ | 2.00 | 162° C. | 152° C. | 141° C. | 135° C. |
| Battery B | $LiCoO_2$ | 1.50 | 160° C. | 153° C. | 140° C. | 136° C. |
| Battery 10 | $Li_{1.01}Co_{0.94}Mg_{0.05}Al_{0.01}O_2$ | 2.00 | 174° C. | 173° C. | 171° C. | 170° C. |
| Battery 11 | $Li_{1.01}Co_{0.94}Mg_{0.05}Al_{0.01}O_2$ | 1.50 | 174° C. | 173° C. | 171° C. | 170° C. |
| Battery 12 | $Li_{1.02}Co_{0.94}Mg_{0.05}Al_{0.01}O_2$ | 2.00 | 174° C. | 173° C. | 172° C. | 171° C. |
| Battery 13 | $Li_{1.02}Co_{0.94}Mg_{0.05}Al_{0.01}O_2$ | 1.50 | 173° C. | 173° C. | 171° C. | 170° C. |
| Battery 14 | $Li_{1.03}Co_{0.94}Mg_{0.05}Al_{0.01}O_2$ | 2.00 | 170° C. | 168° C. | 166° C. | 164° C. |
| Battery 15 | $Li_{1.03}Co_{0.94}Mg_{0.05}Al_{0.01}O_2$ | 1.50 | 171° C. | 169° C. | 166° C. | 165° C. |
| Battery 16 | $LiCo_{0.985}Mg_{0.005}Al_{0.01}O_2$ | 2.00 | 170° C. | 168° C. | 167° C. | 163° C. |
| Battery 17 | $LiCo_{0.985}Mg_{0.005}Al_{0.01}O_2$ | 1.50 | 172° C. | 170° C. | 168° C. | 165° C. |
| Battery 18 | $LiCo_{0.89}Mg_{0.1}Al_{0.01}O_2$ | 2.00 | 175° C. | 173° C. | 171° C. | 170° C. |
| Battery 19 | $LiCo_{0.89}Mg_{0.1}Al_{0.01}O_2$ | 1.50 | 178° C. | 175° C. | 172° C. | 171° C. |
| Battery 20 | $LiCo_{0.949}Mg_{0.05}Al_{0.001}O_2$ | 2.00 | 173° C. | 172° C. | 172° C. | 170° C. |
| Battery 21 | $LiCo_{0.949}Mg_{0.05}Al_{0.001}O_2$ | 1.50 | 174° C. | 173° C. | 171° C. | 170° C. |
| Battery 22 | $LiCo_{0.9}Mg_{0.05}Al_{0.05}O_2$ | 2.00 | 172° C. | 169° C. | 170° C. | 168° C. |
| Battery 23 | $LiCo_{0.9}Mg_{0.05}Al_{0.05}O_2$ | 1.50 | 173° C. | 171° C. | 171° C. | 170° C. |
| Battery 24 | $LiCo_{0.994}Mg_{0.005}Al_{0.001}O_2$ | 2.00 | 168° C. | 159° C. | 155° C. | 150° C. |
| Battery 25 | $LiCo_{0.994}Mg_{0.005}Al_{0.001}O_2$ | 1.50 | 169° C. | 163° C. | 157° C. | 152° C. |
| Battery 26 | $LiCo_{0.85}Mg_{0.1}Al_{0.05}O_2$ | 2.00 | 176° C. | 174° C. | 173° C. | 171° C. |
| Battery 27 | $LiCo_{0.85}Mg_{0.1}Al_{0.05}O_2$ | 1.50 | 178° C. | 175° C. | 173° C. | 172° C. |
| Battery 28 | $LiCo_{0.88}Mg_{0.1}Al_{0.02}O_2$ | 2.00 | 178° C. | 176° C. | 175° C. | 174° C. |
| Battery 29 | $LiCo_{0.88}Mg_{0.1}Al_{0.02}O_2$ | 1.50 | 178° C. | 175° C. | 174° C. | 173° C. |

As can be seen from Table 3, in the case of comparative batteries A and B using $LiCoO_2$ as the positive electrode active material, when the end of charge voltage was 4.2 V, the thermorunaway threshold temperature was 162° C., thereby exhibiting high thermal stability. However, when the end of charge voltage was increased, the thermorunaway threshold temperature lowered remarkably, and the safety of the batteries deteriorated.

From the above, it has been confirmed that the batteries using the predetermined positive electrode active materials exhibit high safety even if they are charged to the high voltage of 4.25 V to 4.5 V. It has also been confirmed that the batteries whose ratios R:Wp/Wn were controlled at 1.5 or more and 2.2 or less exhibit particularly high safety.

Considering all the factors from Tables 1 to 3, it can be understood that even if the battery is charged to the high voltage range of 4.25 to 4.5 V, the use of a predetermined positive electrode active material and the setting of the ratio R:Wp/Wn in the range of 1.3 to 2.2 make it possible to realize a battery having high capacity, excellent charge/discharge cycle characteristics, and high safety, and further, to realize a charge and discharge system including such battery. Particularly when the positive electrode active material is $LiCo_{0.94}Mg_{0.05}Al_{0.01}O_2$, it is effective to control the ratio R in the range of 1.5 to 2.2.

Next, positive electrode active materials containing Ti, Sr, Mn, Ni or Ca instead of Mg were prepared, and using the resultant materials, the same operations as the above were performed. As a result, essentially the same results were obtained.

Further, positive electrode active materials containing Ti, Sr, Mn, Ni or Ca instead of Al were prepared, and using the resultant materials, the same operations as the above were performed. As a result, essentially the same results were obtained as well.

From the above, it has been confirmed that as long as a composite oxide represented by $Li_xCo_{1-y}M_yO_2$ where the element M is at least one selected from the group consisting of Mg, Al, Ti, Sr, Mn, Ni and Ca is used as the positive electrode active material and the ratio R is controlled in the range of 1.5 to 2.2, it is possible to realize a battery having high capacity, excellent charge/discharge cycle characteristics, and high safety, or a charge and discharge system therefor.

Example 2

Batteries 30 to 43 having the relations between Wp, Wn, and the ratio R:Wp/Wn as listed in Table 4 were produced in the same manner as in Example 1, except that composite oxides B as listed in Table 4 were used as the positive electrode active materials. They were subjected to the same experimental evaluation as that of Example 1.

Table 5 shows capacity maintenance rates of the respective batteries after 500 cycles of charge/discharge. Also, Table 6 shows thermorunaway threshold temperatures of the respective batteries in respective charged states.

TABLE 4

| | Positive electrode active material | R: Wp/Wn | Active material weight (mg/cm$^2$) Wp | Wn |
|---|---|---|---|---|
| Battery 30 | $LiNi_{0.4}Mn_{0.4}Co_{0.1}Mg_{0.1}O_2$ | 1.20 | 18.8 | 15.7 |
| Battery 31 | $LiNi_{0.4}Mn_{0.4}Co_{0.1}Mg_{0.1}O_2$ | 1.30 | 19.3 | 14.8 |
| Battery 32 | $LiNi_{0.4}Mn_{0.4}Co_{0.1}Mg_{0.1}O_2$ | 1.40 | 19.8 | 14.1 |
| Battery 33 | $LiNi_{0.4}Mn_{0.4}Co_{0.1}Mg_{0.1}O_2$ | 1.50 | 20.3 | 13.5 |
| Battery 34 | $LiNi_{0.4}Mn_{0.4}Co_{0.1}Mg_{0.1}O_2$ | 1.75 | 21.5 | 12.3 |
| Battery 35 | $LiNi_{0.4}Mn_{0.4}Co_{0.1}Mg_{0.1}O_2$ | 2.00 | 22.8 | 11.4 |
| Battery 36 | $LiNi_{0.4}Mn_{0.4}Co_{0.1}Mg_{0.1}O_2$ | 2.20 | 23.7 | 10.8 |
| Battery 37 | $LiNi_{0.4}Mn_{0.4}Co_{0.1}Mg_{0.1}O_2$ | 2.30 | 24.3 | 10.6 |
| Battery 38 | $LiNi_{0.4}Mn_{0.4}Co_{0.1}Mg_{0.1}O_2$ | 2.40 | 24.8 | 10.3 |
| Battery 39 | $LiNi_{0.45}Mn_{0.45}Co_{0.1}O_2$ | 1.50 | 20.3 | 13.5 |
| Battery 40 | $LiNi_{0.45}Mn_{0.45}Mg_{0.1}O_2$ | 1.50 | 20.3 | 13.5 |
| Battery 41 | $LiNi_{0.45}Mn_{0.45}Al_{0.1}O_2$ | 1.50 | 20.3 | 13.5 |
| Battery 42 | $LiNi_{0.45}Mn_{0.45}Ti_{0.1}O_2$ | 1.50 | 20.3 | 13.5 |
| Battery 43 | $LiNi_{0.45}Mn_{0.45}Sr_{0.1}O_2$ | 1.50 | 20.3 | 13.5 |
| Battery A | $LiCoO_2$ | 2.00 | 22.8 | 11.4 |
| Battery B | $LiCoO_2$ | 1.50 | 20.3 | 13.5 |

TABLE 5

| | Positive electrode active material | R: Wp/Wn | End of charge voltage 4.25 V | 4.4 V | 4.5 V |
|---|---|---|---|---|---|
| Battery 30 | $LiNi_{0.4}Mn_{0.4}Co_{0.1}Mg_{0.1}O_2$ | 1.20 | 78% | 75% | 73% |
| Battery 31 | $LiNi_{0.4}Mn_{0.4}Co_{0.1}Mg_{0.1}O_2$ | 1.30 | 79% | 78% | 76% |
| Battery 32 | $LiNi_{0.4}Mn_{0.4}Co_{0.1}Mg_{0.1}O_2$ | 1.40 | 80% | 82% | 80% |
| Battery 33 | $LiNi_{0.4}Mn_{0.4}Co_{0.1}Mg_{0.1}O_2$ | 1.50 | 82% | 81% | 81% |
| Battery 34 | $LiNi_{0.4}Mn_{0.4}Co_{0.1}Mg_{0.1}O_2$ | 1.75 | 81% | 81% | 80% |
| Battery 35 | $LiNi_{0.4}Mn_{0.4}Co_{0.1}Mg_{0.1}O_2$ | 2.00 | 79% | 75% | 74% |
| Battery 36 | $LiNi_{0.4}Mn_{0.4}Co_{0.1}Mg_{0.1}O_2$ | 2.20 | 76% | 75% | 72% |
| Battery 37 | $LiNi_{0.4}Mn_{0.4}Co_{0.1}Mg_{0.1}O_2$ | 2.30 | 70% | 68% | 62% |
| Battery 38 | $LiNi_{0.4}Mn_{0.4}Co_{0.1}Mg_{0.1}O_2$ | 2.40 | 66% | 55% | 43% |
| Battery 39 | $LiNi_{0.45}Mn_{0.45}Co_{0.1}O_2$ | 1.50 | 80% | 75% | 74% |
| Battery 40 | $LiNi_{0.45}Mn_{0.45}Mg_{0.1}O_2$ | 1.50 | 79% | 75% | 74% |
| Battery 41 | $LiNi_{0.45}Mn_{0.45}Al_{0.1}O_2$ | 1.50 | 78% | 76% | 74% |
| Battery 42 | $LiNi_{0.45}Mn_{0.45}Ti_{0.1}O_2$ | 1.50 | 79% | 74% | 73% |
| Battery 43 | $LiNi_{0.45}Mn_{0.45}Sr_{0.1}O_2$ | 1.50 | 77% | 73% | 72% |
| Battery A | $LiCoO_2$ | 2.00 | 45% | 39% | 31% |
| Battery B | $LiCoO_2$ | 1.50 | 44% | 40% | 30% |

TABLE 6

| | Positive electrode active material | R: Wp/Wn | End of charge voltage 4.2 V | 4.25 V | 4.4 V | 4.5 V |
|---|---|---|---|---|---|---|
| Battery 30 | $LiNi_{0.4}Mn_{0.4}Co_{0.1}Mg_{0.1}O_2$ | 1.20 | 174° C. | 173° C. | 171° C. | 171° C. |
| Battery 31 | $LiNi_{0.4}Mn_{0.4}Co_{0.1}Mg_{0.1}O_2$ | 1.30 | 173° C. | 171° C. | 172° C. | 170° C. |
| Battery 32 | $LiNi_{0.4}Mn_{0.4}Co_{0.1}Mg_{0.1}O_2$ | 1.40 | 175° C. | 173° C. | 171° C. | 170° C. |
| Battery 33 | $LiNi_{0.4}Mn_{0.4}Co_{0.1}Mg_{0.1}O_2$ | 1.50 | 174° C. | 171° C. | 170° C. | 170° C. |
| Battery 34 | $LiNi_{0.4}Mn_{0.4}Co_{0.1}Mg_{0.1}O_2$ | 1.75 | 173° C. | 172° C. | 171° C. | 170° C. |
| Battery 35 | $LiNi_{0.4}Mn_{0.4}Co_{0.1}Mg_{0.1}O_2$ | 2.00 | 173° C. | 172° C. | 171° C. | 172° C. |
| Battery 36 | $LiNi_{0.4}Mn_{0.4}Co_{0.1}Mg_{0.1}O_2$ | 2.20 | 170° C. | 162° C. | 160° C. | 155° C. |
| Battery 37 | $LiNi_{0.4}Mn_{0.4}Co_{0.1}Mg_{0.1}O_2$ | 2.30 | 168° C. | 158° C. | 150° C. | 150° C. |
| Battery 38 | $LiNi_{0.4}Mn_{0.4}Co_{0.1}Mg_{0.1}O_2$ | 2.40 | 165° C. | 160° C. | 150° C. | 154° C. |
| Battery 39 | $LiNi_{0.45}Mn_{0.45}Co_{0.1}O_2$ | 1.50 | 173° C. | 172° C. | 171° C. | 170° C. |
| Battery 40 | $LiNi_{0.45}Mn_{0.45}Mg_{0.1}O_2$ | 1.50 | 172° C. | 172° C. | 171° C. | 171° C. |
| Battery 41 | $LiNi_{0.45}Mn_{0.45}Al_{0.1}O_2$ | 1.50 | 171° C. | 172° C. | 171° C. | 170° C. |
| Battery 42 | $LiNi_{0.45}Mn_{0.45}Ti_{0.1}O_2$ | 1.50 | 172° C. | 172° C. | 170° C. | 169° C. |
| Battery 43 | $LiNi_{0.45}Mn_{0.45}Sr_{0.1}O_2$ | 1.50 | 170° C. | 171° C. | 168° C. | 165° C. |
| Battery A | $LiCoO_2$ | 2.00 | 162° C. | 152° C. | 141° C. | 135° C. |
| Battery B | $LiCoO_2$ | 1.50 | 160° C. | 153° C. | 140° C. | 136° C. |

As can be seen from Tables 4 to 6, the batteries 30 to 43 exhibited excellent charge/discharge cycle characteristics and safety. Also, the batteries 31 to 35 and 39 to 43, whose ratios R:Wp/Wn were in the range of 1.3 to 2.0, exhibited high safety even when they were charged to the high voltage of 4.25 V to 4.5.

Next, positive electrode active materials containing Al, Ti, Sr or Ca instead of Mg were prepared, and using the resultant materials, the same operations as the above were performed. As a result, essentially the same results were obtained.

Further, positive electrode active materials containing Al, Ti, Sr or Ca instead of Co were prepared, and using the resultant materials, the same operations as the above were performed. As a result, essentially the same results were obtained as well.

From the above, it has been confirmed that as long as a composite oxide represented by $Li_xNi_yMn_zM_{1-y-z}O_2$ where the element M is at least one selected from the group consisting of Mg, Al, Ti, Sr, Mn, Ni and Ca is used as the positive electrode active material and the ratio R is controlled in the range of 1.3 to 2.0, it is possible to realize a battery having high capacity, excellent charge/discharge cycle characteristics, and high safety, or a charge and discharge system therefor.

INDUSTRIAL APPLICABILITY

As described above, the present invention can provide a high-capacity non-aqueous electrolyte secondary battery that operates normally even if the end of charge voltage is set to 4.25 to 4.5 V in normal operation. Also the non-aqueous electrolyte secondary battery of the present invention can exhibit excellent charge/discharge cycle characteristics and maintain high safety even if it is used in the high voltage range of 4.25 to 4.5 V.

The invention claimed is:

1. A non-aqueous electrolyte secondary battery comprising:
   a positive electrode comprising a positive electrode substrate and a positive electrode material mixture layer carried on said positive electrode substrate;
   a negative electrode comprising a negative electrode substrate and a negative electrode material mixture layer carried on said negative electrode substrate;
   a separator or lithium-ion conductive porous film interposed between said positive electrode and said negative electrode; and
   a lithium-ion conductive non-aqueous electrolyte,
   wherein said positive electrode material mixture layer comprises a positive electrode active material comprising a lithium transition metal composite oxide, wherein said lithium transition metal composite oxide is represented by the general formula (I):

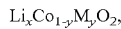
   $Li_xCo_{1-y}M_yO_2$, said general formula (1) satisfies 1.0≤x≤1.03 and 0.051≤y≤0.15, the element M in said general formula (1) is at least two selected from the group consisting of Mg, Al, Sr, Mn and Ca,
   said negative electrode material mixture layer comprises a negative electrode active material comprising a carbon material that is capable of absorbing and desorbing lithium,
   the end of charge voltage of said non-aqueous electrolyte secondary battery is set to 4.25 to 4.5 V in normal operation, and
   the ratio R:Wp/Wn is 1.5 to 2.2 in the area where said positive electrode material mixture layer and said negative electrode material mixture layer are opposed to each other, said Wp being the weight of the positive electrode active material contained in said positive electrode material mixture layer per unit opposed area, said Wn being the weight of the negative electrode active material contained in said negative electrode material mixture layer per unit opposed area.

2. The non-aqueous electrolyte secondary battery in accordance with claim 1, wherein said positive electrode material mixture layer contains a metal oxide represented by the general formula (3): $MO_x$,
   said general formula (3) satisfies 0.4≤x≤2.0, and
   the element M in said general formula (3) is at least one selected from the group consisting of Li, Co, Mg, Al, Ti, Sr, Mn, Ni and Ca.

3. A charge and discharge system for a non-aqueous electrolyte secondary battery, comprising the non-aqueous electrolyte secondary battery as recited in claim 1 and a charger for said non-aqueous electrolyte secondary battery, wherein said charger is set such that it stops charging when the voltage of said secondary battery reaches 4.25 to 4.5 V.

4. The non-aqueous electrolyte secondary battery in accordance with claim 1, wherein said carbon material is at least one selected from the group consisting of thermally decomposed carbons, cokes, graphites, glass carbons, material obtained by baking phenolic resin, materials obtained by baking furan resin, carbon fibers and active carbon.

5. The non-aqueous electrolyte secondary battery in accordance with claim 1, wherein the end of charge voltage of said non-aqueous electrolyte secondary battery is set to higher than 4.30 V and 4.5 V or lower in normal operation.

6. The non-aqueous electrolyte secondary battery in accordance with claim 1, wherein the end of charge voltage of said non-aqueous electrolyte secondary battery is set to 4.35 V to 4.5 V in normal operation.

7. The charge and discharge system for a non-aqueous electrolyte secondary battery in accordance with claim 3, wherein said charger is set such that it stops charging when the voltage of said secondary battery reaches higher than 4.30 V and 4.5 V or lower.

8. The charge and discharge system for a non-aqueous electrolyte secondary battery in accordance with claim 3, wherein said charger is set such that it stops charging when the voltage of said secondary battery reaches 4.35 V to 4.5 V.

* * * * *